(No Model.)

O. A. NORLUND.
NUT LOCK.

No. 570,101. Patented Oct. 27, 1896.

Witnesses
A. M. Poynton,
J. F. Riley

Inventor
Olof A. Norlund,
By his Attorneys,
C. A. Snow & Co.

United States Patent Office.

OLOF A. NORLUND, OF CEDAR RUN, PENNSYLVANIA, ASSIGNOR OF ONE-HALF TO WILLIAM B. CLARK, OF SAME PLACE.

NUT-LOCK.

SPECIFICATION forming part of Letters Patent No. 570,101, dated October 27, 1896.

Application filed April 22, 1896. Serial No. 588,660. (No model.)

*To all whom it may concern:*

Be it known that I, OLOF A. NORLUND, a citizen of the United States, residing at Cedar Run, in the county of Lycoming and State of Pennsylvania, have invented a new and useful Nut-Lock, of which the following is a specification.

The invention relates to improvements in nut-locks.

The object of the present invention is to improve the construction of nut-locks, and to provide a simple, inexpensive, and efficient one, capable of being readily applied to the ordinary construction of bolts without grooving, recessing, or in any manner altering the construction thereof, and adapted to securely lock a nut against accidental unscrewing.

A further object of the invention is to provide a nut-lock which will not materially weaken a nut, and which will enable the latter to be removed or adjusted when desired.

The invention consists in the construction and novel combination and arrangement of parts hereinafter fully described, illustrated in the accompanying drawings, and pointed out in the claim hereto appended.

Figure 1:
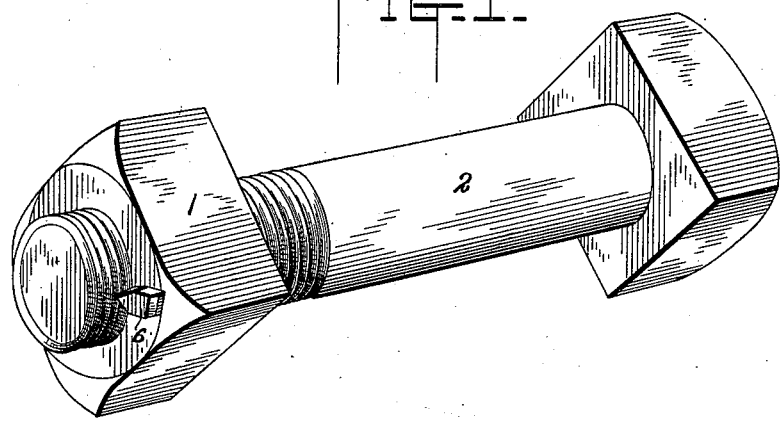
Figure 2:
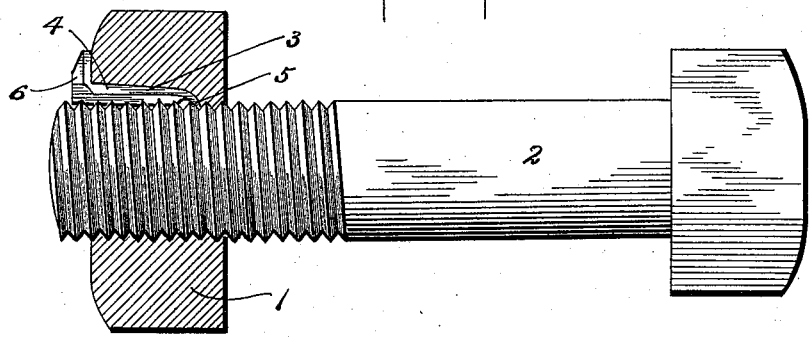
Figure 3:
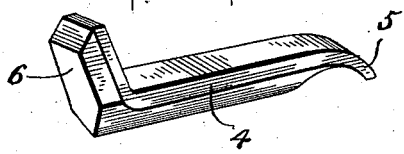
Figure 4:
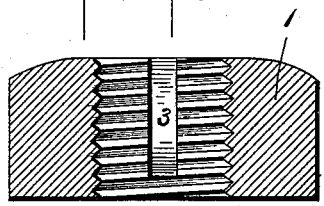

In the drawings, Figure 1 is a perspective view of a nut-lock constructed in accordance with this invention. Fig. 2 is a central longitudinal sectional view. Fig. 3 is a detail perspective view of the locking key or wedge. Fig. 4 is a sectional view of the nut, showing the groove thereof in plan view.

Like numerals of reference designate corresponding parts in all the figures of the drawings.

1 designates a nut mounted on a bolt 2 and provided within its bore with a longitudinal groove 3, terminating short of the inner face of the nut and adapted to receive a locking key or wedge 4, which engages the bolt and is adapted to prevent the nut from rotating thereon. The groove tapers in width and its bottom at its inner end curves toward the bore of the nut to direct the inner end or point 5 of the locking key or wedge between two of the threads of the bolt, whereby the locking key or wedge is prevented from becoming accidentally displaced and is firmly held in position. The engaging edge of the key or wedge is sharpened and is adapted to bite into the threads of the bolt to lock the nut, and the key or wedge is provided at its outer end with a head 6, which bears against the outer face of the nut and which is adapted to be engaged by a pair of pincers or other suitable tool to withdraw the wedge or key from the nut when it is desired to remove the latter or adjust the same.

As the wedge or key is driven into the groove of the nut the inner end of the groove turns the inner end 5 of the key into engagement with the adjacent threads of the bolt, and as the end 5 is reduced in thickness it is readily forced between such threads of the bolt and interlocks with the latter. The tapering groove also causes the cutting or engaging edge of the wedge or key to be embedded into the threads of the bolt, and a nut may be securely locked against accidental rotation at any point of a bolt.

It will be seen that the nut-lock is exceedingly simple and inexpensive in construction, that it is positive and reliable in operation, and that it does not materially weaken a nut and is capable of locking the same at any point on a bolt.

It will also be apparent that the wedge is adapted to engage the bolts of the ordinary construction without grooving or in any manner altering the same.

Changes in the form, proportion, and minor details of construction may be resorted to without departing from the spirit or sacrificing any of the advantages of this invention.

What I claim is—

The combination with a bolt of the ordinary construction, of a nut provided on its interior with a longitudinal groove terminating short of the inner face of the nut, tapering throughout its entire length and having its inner end curved toward the bolt, and a tapering key having a sharpened inner longitudinal edge arranged to engage and bite the threads of a bolt, whereby the nut is secured to the bolt without recessing or grooving the latter, said key having a reduced inner end adapted, when forced into the groove of the nut to be bent inward by the inner end of the same, and forced between two of the threads of the bolt to lock the key against accidental withdrawal, substantially as described.

In testimony that I claim the foregoing as my own I have hereto affixed my signature in the presence of two witnesses.

OLOF A. NORLUND.

Witnesses:
JOHN HILBORN,
GEORGE A. GAMBLE.